Dec. 9, 1947.  J. C. CROWLEY  2,432,139
PORTABLE TIRE REPAIR UNIT
Filed Dec. 15, 1944  2 Sheets-Sheet 1
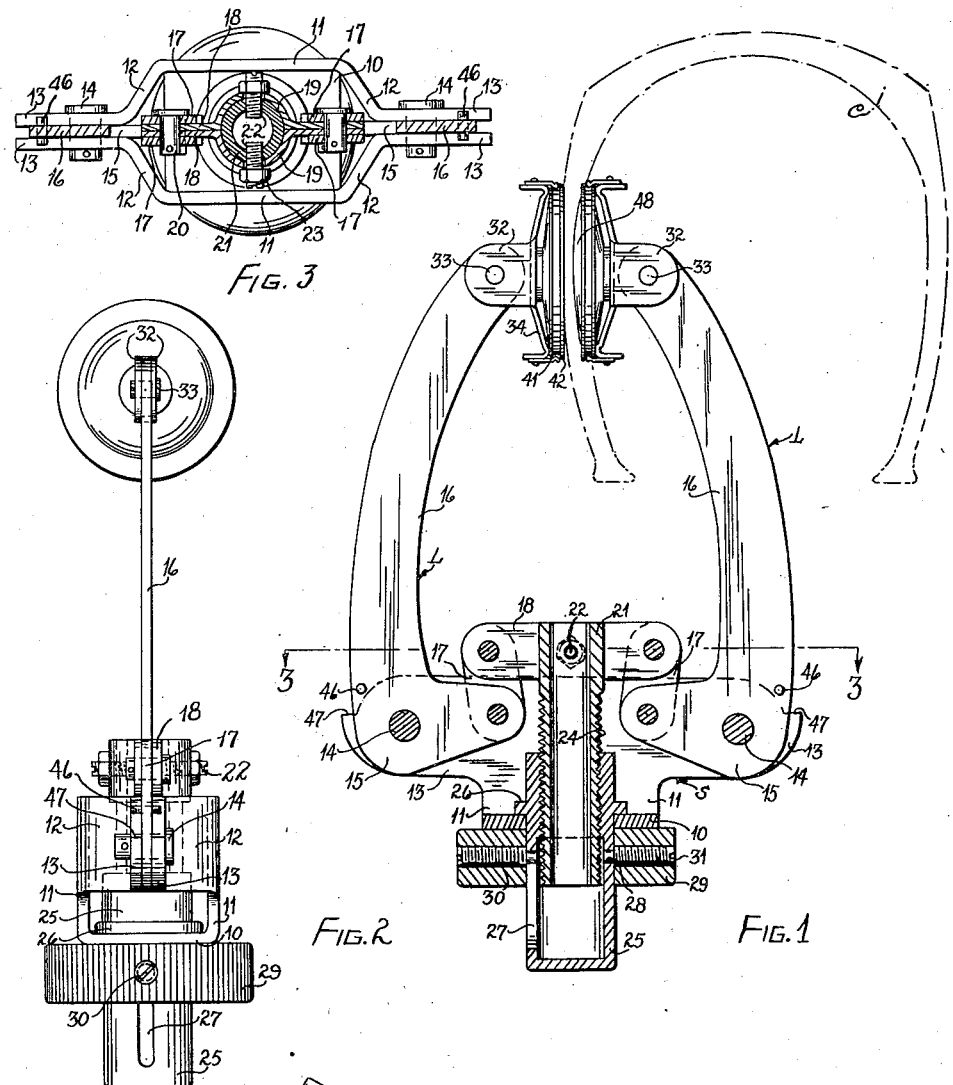
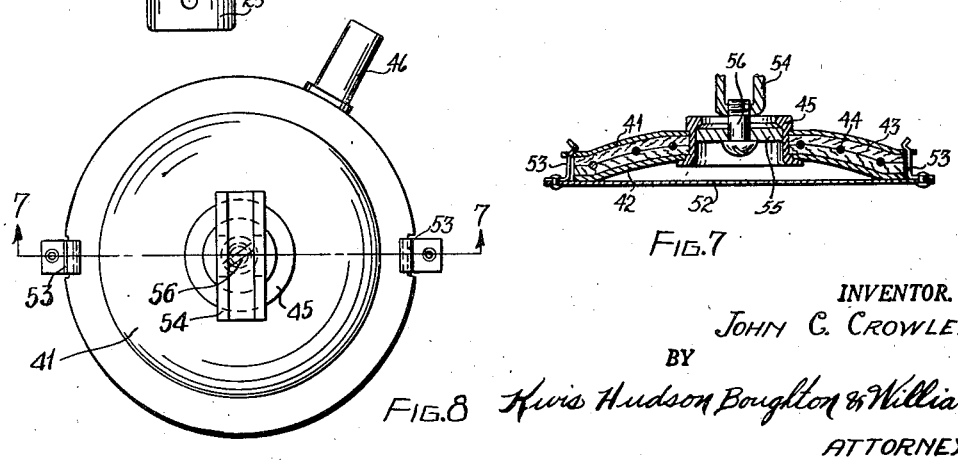
INVENTOR.
JOHN C. CROWLEY
BY Kwis Hudson Boughton & Williams
ATTORNEYS Dec. 9, 1947.  J. C. CROWLEY  2,432,139
PORTABLE TIRE REPAIR UNIT
Filed Dec. 15, 1944  2 Sheets-Sheet 2

INVENTOR.
JOHN C. CROWLEY
BY
Kwis Hudson Boughton & Williams
ATTORNEYS

Patented Dec. 9, 1947

2,432,139

UNITED STATES PATENT OFFICE 2,432,139

PORTABLE TIRE REPAIR UNIT

John C. Crowley, Cleveland Heights, Ohio, assignor to The Dill Manufacturing Company, Cleveland, Ohio, a corporation of Ohio Application December 15, 1944, Serial No. 568,273

6 Claims. (Cl. 18—18)

This invention relates to a vulcanizing unit and particularly to a vulcanizing unit for repairing the casings of pneumatic tires.

An object of the invention is to provide an improved vulcanizing unit which is portable and which can be efficiently and readily used for repairing the casings of pneumatic tires.

Another object is to provide a vulcanizing unit such as specified in the first named object and which unit can be readily adapted for repairing either the side walls of a tire casing or the tread portion of such casing.

Another object is to provide a vulcanizing repair unit for tire casings and wherein the repair material or patch is carried by a plate which is removably attached to a heating element.

A further object is to provide a portable vulcanizing repair unit for tire casings capable of applying pressure to both the inner and outer sides of the casing at the point where the repair is being made and also capable of applying heat to one side only of the casing or to both sides thereof.

A still further object is to provide a vulcanizing repair unit for tire casings wherein the unit can be supported by its clamping or gripping pressure on the tire casing.

Another object is to provide a portable vulcanizing unit for repairing tire casings and wherein the repairing material or patch and the heating element or elements are separable and are removably attached to the elements of the unit which provide the clamping or gripping pressure.

Another object is to provide a portable repair unit for tire casings wherein heat producing members are operatively associated with the means for clamping a portion of the tire casing between said members and which heat producing members are connected in series in an electrical circuit which includes the clamping means as a part of the circuit.

Another object is to provide a portable vulcanizing repair unit for tire casings such as referred to in the last named object and wherein at least one of the heat producing members includes a fusible element which fuses at a predetermined heat to interrupt the circuit through all of said heat producing elements.

Another object is to provide portable vulcanizing repair units for tire casings, such as referred to previously herein, and which are simple in design, readily manufactured and efficiently and easily used.

Further and additional objects and advantages of the invention will appear hereinafter during the detailed description which is to follow.

Referring to the accompanying drawings,

Fig. 1 is a view partly in side elevation and partly in section of a portable vulcanizing repair unit embodying the invention and shows said unit in clamped, vulcanizing engagement with a side wall of a tire casing.

Fig. 2 is a side elevational view of the unit shown in Fig. 1 and is taken looking from the left hand side of Fig. 1.

Fig. 3 is a sectional view taken substantially on line 3—3 of Fig. 1 looking in the direction of the arrows.

Figure 4:
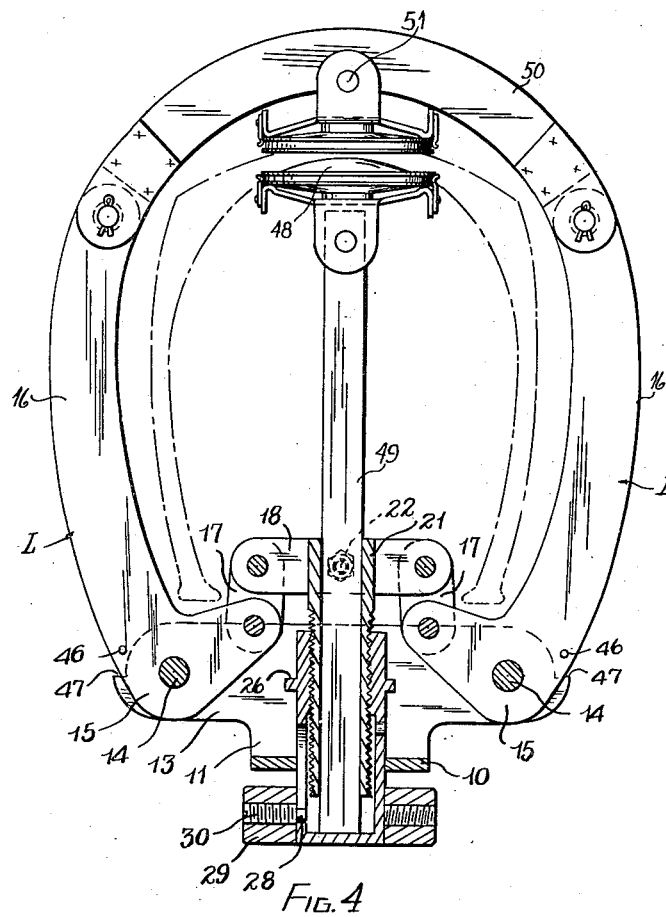
Fig. 4 is a view similar to Fig. 1 but illustrates the unit adapted for repairing the tread portion of a tire casing, said unit being shown in clamped position on such portion of the casing.

Fig. 7 is a sectional view through a slightly different form of heat producing member and detachable plate or disk than has been shown in the preceding views and also illustrates a different way of connecting the heat producing member to the supporting element of the unit, said view being taken along line 7—7 of Fig. 8 looking in the direction of the arrows, and Fig. 8 is a top plan view of the construction shown in Fig. 7.

Referring to Figs. 1, 2 and 3, the unit is shown as comprising a support indicated generally at S and which may take the form of a sheet metal stamping or a metal casting or it may be formed of some other suitable material and in some other desired way. The support S comprises a base 10 which has along its opposite longitudinal edges upstanding walls 11 and which walls adjacent their outer edges and at each end are extended convergently toward each other as indicated at 12 and then project outwardly in spaced parallel relationship as indicated at 13. Levers L are rockably mounted in the spaced parallel portions 13 of the base on fulcrum pins 14 carried by said base portions. The fulcrum pins 14 are located at the junction of the short arms 15 of the levers L with the long arms 16 thereof. The short arms 15 of the levers L are located intermediate the walls of the support S as clearly shown in the drawings, while the long arms 16 of the levers extend outwardly from the base support. The free ends of the short arms 15 of the levers are pivotally connected to one end of links 17 which straddle the arms 15 and also straddle and are pivotally connected with the opposite ends of a member now to be described. The member just referred to comprises a pair of contacting plates 18 provided intermediate their ends with bowed complementary semi-circular portions 19 forming together a supporting ring for a purpose later to be pointed out. As previously stated, the links 17 straddle the opposite ends of the straps 18 and said links are pivotally connected to the straps by means of pins 20.

The supporting ring formed by the semi-cylindrical portions 19 of the plates 18 has mounted therein a tubular part 21 with said part connected to the supporting ring by means of screws 22 screwed through openings in the supporting ring and in the part 21 and locked in adjusted position by clamping nuts 23. The tubular part 21 is externally threaded as indicated at 24 and extends into the open end of a sleeve 25 that is closed at its opposite end with said part 21 screwing into the internal threads of the sleeve. The sleeve 25 extends through a central opening in the base 10 of the support S and has its axial movement relative to said base in one direction limited by a flange 26 formed on the sleeve and contacting the base in certain positions of the sleeve. The sleeve 25 is provided with an elongated slot 27 and on the side diametrically opposed to said slot with an opening 28. An actuating knob 29, preferably knurled on its periphery, is mounted on the sleeve 25 and carries a screw 30 having a reduced end which engages in the slot 27 and hence when said knob is rotated the sleeve 25 will rotate therewith. In certain uses of the unit the knob 29 also has a screw 31, the reduced inner end of which engages in the opening 28 of the sleeve 25.

Figure 6:
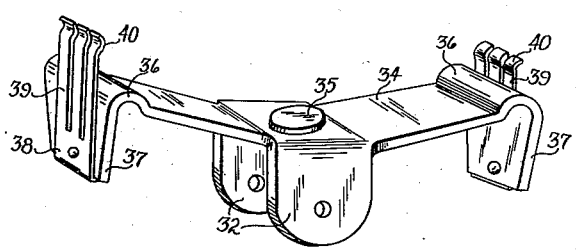
Fig. 6 is a detached perspective view on a larger scale of one of the supporting straps which removably support the heat producing members of the unit.

The free ends of the arms 16 of the levers L are straddled by the parallel ears 32 of straps which support the heat producing members of the unit and said ears are pivotally connected to the free ends of the lever arms 16 by pins 33. Referring to Fig. 6 it will be seen that the ears 32 are integral with and project from the opposite sides of straps 34 which have a central portion extending substantially perpendicular to the ears 32 and have portions which extend from the central portion at an angle to the plane thereof. The central portions of the straps 34 are provided with centrally located circular bosses or buttons 35 for a purpose later to be described. The straps 34 at their opposite ends are curved as indicated at 36, and terminate in portions 37 extending from the straps in the same general direction as the ears 32 but located in planes substantially at right angles to the planes of the ears. The portions 37 of the straps 34 have secured to their outer sides retaining members 38 which are provided with separated spring fingers 39 that have at their free ends curved portions 40.

The straps 34 as already stated removably hold and support the heat producing members of the unit. These members preferably are of the form shown in my Reissue Patent 21,230, granted October 10, 1939. As stated in said reissue patent, the vulcanizing unit disclosed therein comprises a member formed of a pair of spaced plates 41 and 42 having therebetween suitable insulation indicated in Fig. 7 at 43 in which is embedded an electrical resistance element 44. The plates 41 and 42, the insulation 43 and the resistance element 44 are held together in assembled relationship by a hollow rivet 45. One end of the resistance element 44 is electrically connected to a tab 46, see Fig. 8, while the opposite end of said resistance element may be electrically connected to the plate 42. In my said reissue patent the plate 42 is shown as provided with a spring finger cut from the material of the plate and underlying an end of the resistance element in such manner that when said spring finger is pressed in one direction it engages the end of the resistance element and then the plate 42 is electrically connected to said element. The vulcanizing unit disclosed in my said Reissue Patent 21,230 also includes a second member in the form of a disk which is placed against the plate 42 and is provided with a fusible plug that contacts the spring finger of the plate 42 and holds said finger in engagement with the end of the resistance element 44. The plate 41 is provided in its peripheral edges with spaced notches of predetermined size and location and which notches are engaged by lugs formed on the disk to hold the disk in the proper position. In my Reissue Patent 21,230 the disk carries on its free side the vulcanizing patch. It will be understood that when the resistance element 44 is placed in an electrical circuit vulcanizing heat is produced and when said heat attains to a predetermined degree the fusible plug of the disk fuses to automatically interrupt the circuit through the resistance element. Rather than describe in greater detail herein the heat producing member and the disk which is applied thereto, reference is made to my said Reissue Patent 21,230 for a complete description of the construction and mode of operation of this device.

The heat producing members are removably mounted in the straps 34 and are held therein by the spring fingers 39 which grip the circumference of the heat producing members at diametrically opposite sides with the curved portions 40 of the fingers engaging in the space between the plates 41 and 42.

As already explained, the disks which carry the vulcanizing patch are held in assembled relation with the heat producing members by means of lugs carried by the disks and engaging in recesses formed in the plate 41. When the heat producing members are positioned or mounted in the straps 34 the buttons 35 of said straps engage in the hollow rivets 45 and act to center the members in the straps.

It will be seen that when the unit is as illustrated in Fig. 1, turning of the knob 29 will rotate the sleeve 25 but that said sleeve is held against axial displacement due to the engagement of the flange 26 and knob 29 with the base 10 of the support S. Therefore the turning movement of the knob 29 and sleeve 25 will screw the tubular member 21 inwardly or outwardly of the sleeve, depending upon the direction of rotation of the knob. When the knob is turned in the direction which screws the member 21 outwardly of the sleeve 25 the levers L will be rocked on their fulcrums to separate the long lever arms 16, the outward movement of such arms being limited by stop pins 46 engaging shoulders 47 formed on the portions 13 of the walls 11 of the support S.

Assuming that heat producing members are mounted in the straps 34 and disks are connected to each of said members with one of the disks carrying on its outer side the vulcanizing patch 48, the unit is positioned relative to the tire casing C to have the side wall of the tire which is to be repaired extending between the disks of the heat producing members. The knob 29 is then rotated to cause the tubular member 21 to screw into the sleeve 25 and through the plates 18 and links 17 to rock the levers L until the disks tightly clamp the side wall of the casing between them with the patch 48 located over the break or hole in the casing that is to be repaired. The clamping engagement of the disks with the side wall of the casing acts to hold the unit in position on the casing.

Although one of the heat producing members only may be placed in the electrical circuit with the other member acting merely to apply pressure, it is preferable that both heat producing members be included in the electrical circuit so that heat is applied to the casing from both sides of the side wall thereof. The electrical circuit may be arranged in the following manner: One side of the circuit is connected to the tab 46 of one heat producing member and the circuit then extends from this tab through the resistance element of said member, the spring arm of the plate 42 of said member, the fusible plug carried by the disk, and thence through the disk and the plate 41 and through the lever arms L and the other parts of the unit and thence through the plates of the other heat producing member, the disk carried thereby and a plug on said disk which, in this instance, need not be a fusible plug. The circuit then extends from such plug, through the spring arm of the plate 42 of the second heat producing member and thence through the resistance element 44 thereof and tab 46 which is connected to the other side of the circuit. In other words, the heat producing members are connected in series in a circuit which includes the clamping levers and the other parts of the repair unit but with only a fusible plug used in connection with one of the heat producing elements. When electrical energy is flowing through the resistance elements of the heat producing members and the circuit just referred to, vulcanizing heat will be produced and the patch 48 vulcanized to the side wall of the casing and as soon as the vulcanizing heat reaches a predetermined degree the fusible plug of the one disk will fuse and the circuit will be interrupted through both heat producing members which, as stated, are arranged in series.

Figure 5:
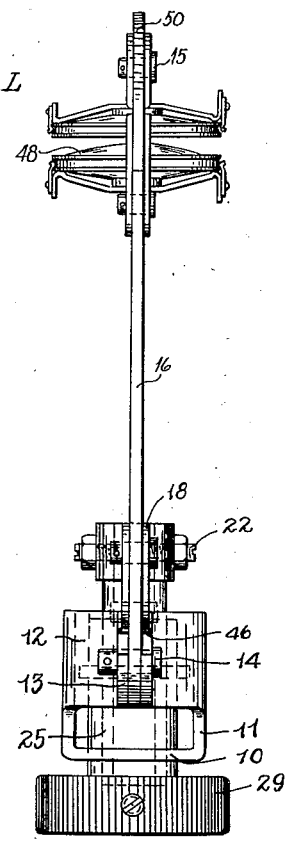
Fig. 5 is a side elevational view of the unit shown in Fig. 4 and is taken looking from the left hand side of Fig. 4.

The portable repair unit can also be utilized for repairing the tread portion of a tire casing, as illustrated in Figs. 4 and 5. When the repair unit is assembled for repairing the tread portion of a tire casing the ears 32 of the strap members 34 are disconnected from the free ends of the lever arms 16 by removing the pins 33, which pins may have been held in place by means of cotters. The levers L are then spread apart until the stop pins 46 engage the shoulders 47. A rod 49 is mounted in the tubular member 21 and contacts the closed end of the sleeve 25. One of the strap members 34 is secured to the upper end of the rod 49 by means of a removable pin which passes through the ears 32 and said rod. A heat producing member and a disk are mounted in such strap and the disk is provided with the patch 48 that is to be vulcanized to the tread portion of the casing. The unit is arranged with the rod 49 extending into the casing until the patch contacts that part of the tread portion thereof which is to be repaired. Then a curved connecting member 50, provided at its opposite ends with forked portions, is arranged so that said portions straddle the free ends of the lever arms 16 and are connected thereto by means of removable pins. The curved connecting member 50 is provided intermediate its ends and in line with the rod 49 with an opening so that the other strap 34 can have its ears 32 straddle the member 50 and a connecting pin 51 can be passed through the openings in the ears 32 and the opening in the connecting member. A heat producing member and a disk are mounted in this last mentioned strap and will engage the tread portion of the casing in directly opposed relation to the engagement thereof by the patch 48.

In order to apply clamping pressure to the tread portion of the casing the screw 31 is removed or backed out of the knob 29 and said knob is slid downwardly on the sleeve 25 to the lower end of the slot 27. Consequently when the knob 29 is rotated the sleeve 25 can move axially since it is not held now against axial movement by the flange 26 and the knob 29 engaging the base 10 of the support S. Therefore said sleeve 25 will screw inwardly or outwardly on the tubular member 21 when the knob is rotated, and since the rod 49 engages the closed end of the sleeve said rod can be pushed upwardly when said sleeve is screwed upwardly on the tubular member 21, with the result that the patch 48 will be moved into tight engagement with the tread portion of the casing and said portion will be firmly clamped between said patch and the disk carried by the heat producing member on the other side of the tread portion of the casing and connected to the connecting member 50. The manner in which the vulcanizing heat is produced and the circuit used therefor can be the same as described in connection with the arrangement shown in Fig. 1.

It will be seen that the portable repair unit can be used with facility for repairing either the side walls or the tread portion of a tire casing and that such dual use is accomplished by making a few simple changes and substitutions in the arrangement and parts of the device.

In Figs. 7 and 8 the heat producing member and the disk carried thereby are connected to the lever arm in a slightly different way than has been previously described. In this form the disk indicated at 52 is provided with spring arms 53 which snap into recesses formed in the periphery of the plate 41 and act to hold the disk assembled with respect to the heat producing member. Instead of the heat producing member being held by spring fingers in the strap 34 it is attached to a U-shaped element 54 which in turn is connected to the free ends of the lever arm 16 or to the rod 49 or connecting member 50 as the case may be. The hollow rivet 45 of the heat producing member may have a disk 55 located therein and which carries a screw 56 that can be screwed into an opening in the closed end of the U-shaped member 54, as clearly shown in Fig. 7.

In view of the detailed description hereinbefore set forth it will be seen that a portable repair unit embodying the invention attains the objects specified and can be readily and efficiently employed for repairing the side walls or the tread portion of a tire casing.

Although a preferred embodiment of the invention has been illustrated and described herein it will be understood that the invention is susceptible of various modifications and adaptations within the scope of the appended claims.

Having thus described my invention, I claim:

1. A portable tire casing repair unit comprising opposed supporting means adapted to be arranged one within the casing and one exteriorly of the casing, pressure applying means operatively associated with said opposed supporting means and adapted to grip the casing therebetween, one of said pressure applying means including a heat producing member and a repair patch carrying member, relatively movable members operatively associated with said opposed supporting means and adapted to be arranged with one member entirely exteriorly of said casing and the other member extending into said casing, and means for actuating said relatively movable members toward and away from each other and including a support, a threaded member rotatably carried by said support, a second threaded member having telescopic engagement with said first threaded member and axial movement relative thereto, and operative connections between said relatively movable members and said threaded members and carried by said support.

2. A portable tire casing repair unit comprising opposed supporting means adapted to be arranged one within the casing and one exteriorly of the casing, pressure applying means associated with said opposed supporting means and adapted to grip the casing therebetween, one of said pressure applying means including a heat producing member and a repair patch carrying member, relatively movable members operatively associated with said opposed supporting means and adapted to be arranged with one member entirely exteriorly of said casing and the other member extending into said casing; and means for actuating said relatively movable members toward and away from each other and including a support, a threaded member rotatably carried by said support, a second threaded member having telescopic engagement with said first threaded member and axial movement relative thereto; and operative connections between said movable members and said threaded members and including a plate member connected with one of said threaded members and links connecting said plate with at least one of said relatively movable members.

3. A portable tire casing repair unit comprising a support, lever arms rockably carried by said support and adapted to be arranged with one lever arm entirely exteriorly of said casing and the other lever arm extending into said casing, supporting members attached to said lever arms and adapted to be arranged one within the casing and one exteriorly of the casing, pressure applying means carried by said supporting members and adapted to grip the casing therebetween, one of said pressure applying means including a heat producing member and a repair patch carrying member, and means carried by said support for rocking said lever arms toward and from each other.

4. A portable tire casing repair unit comprising a support, a threaded member rotatably carried by said support and held against axial movement relative thereto, a second threaded member having telescopic threaded engagement with said first threaded member and movable axially relatively thereto upon rotation of said first threaded member, lever arms rockably mounted on said support and adapted to be arranged one entirely exteriorly of the tire casing and one extending into said tire casing, operative connections between said second threaded member and said lever arms, supporting members detachably connected to said lever arms with one located within the tire casing and one without the tire casing, and pressure applying means carried by said supporting members and adapted to grip the casing therebetween, one of said pressure applying means including a heat producing member and a repair patch carrying member.

5. A portable tire casing repair unit comprising a support, an internally threaded sleeve rotatably and axially movable in said support and which sleeve has one end closed and the other end open, an externally threaded tubular member screwed into said sleeve, a rod extending through said tubular member and engaging the closed end of said sleeve and adapted to extend into the tire casing, lever arms mounted on said support adjacent the opposite ends thereof, a connecting member detachably secured to the free ends of said lever arms, said connecting member and said lever arms adapted to be arranged exteriorly of the tire casing, connections between said tubular member and said lever arms, said connecting member and said rod having detachably secured thereto supporting members arranged in opposed relationship one exteriorly of the casing and one within the casing, and pressure applying means carried by said supporting members and adapted to grip the casing therebetween, one of said pressure applying means including a heat producing member and a repair patch carrying member.

6. A portable tire casing repair unit comprising opposed supporting means adapted to be arranged one within the casing and one exteriorly of the casing, pressure applying means carried by said opposed supporting means and adapted to grip the casing therebetween, one of said pressure applying means including a heat producing member and a repair patch carrying member, relatively movable members operatively associated with said opposed supporting means and adapted to be arranged with one member entirely exteriorly of said casing and the other member extending into said casing, and means for actuating said relatively movable members toward and away from each other and including a support, an internally threaded sleeve rotatably carried by said support, said sleeve having one end closed and the other end open and provided adjacent its open end with an external flange and adjacent its closed end with an elongated axially extending slot, said sleeve also being provided with an opening diametrically opposed to the inner end of said slot, a knob mounted on said sleeve and having an element extending into said slot, wherefore rotation of said knob rotates said sleeve, said knob being provided with a threaded opening adapted to receive a locking screw extending into said opening in the sleeve, wherefore said sleeve can be locked against axial movement relative to said support by the engagement with said support of said annular flange and said knob, a tubular externally threaded member screwed into said sleeve through the open end thereof, and operative connections between said movable members, said sleeve and said tubular member.

JOHN C. CROWLEY.

REFERENCES CITED

The following references are of record in the file of this patent:

UNITED STATES PATENTS

| Number | Name | Date |
|---|---|---|
| Re. 21,230 | Crowley | Oct. 10, 1939 |
| 57,447 | Stockman | Aug. 21, 1866 |
| 1,718,485 | O'Sullivan | June 25, 1929 |
| 1,829,778 | Barton | Nov. 3, 1931 |
| 2,158,703 | Kite | May 16, 1939 |
| 2,249,249 | Meath | July 15, 1941 |
| 2,290,343 | Martin | July 21, 1942 |
| 2,347,952 | James | May 2, 1944 |